United States Patent
Tokunaga et al.

(10) Patent No.: US 9,382,152 B2
(45) Date of Patent: Jul. 5, 2016

(54) NON-ALKALI GLASS AND METHOD FOR PRODUCING SAME

(71) Applicant: ASAHI GLASS COMPANY, LIMITED, Chiyoda-ku (JP)

(72) Inventors: Hirofumi Tokunaga, Tokyo (JP); Tomoyuki Tsujimura, Tokyo (JP); Manabu Nishizawa, Tokyo (JP); Akio Koike, Tokyo (JP)

(73) Assignee: ASAHI GLASS COMPANY, LIMITED, Chiyoda-ku (JP)

( * ) Notice: Subject to any disclaimer, the term of this patent is extended or adjusted under 35 U.S.C. 154(b) by 0 days.

(21) Appl. No.: 14/524,880

(22) Filed: Oct. 27, 2014

(65) Prior Publication Data
US 2015/0045203 A1 Feb. 12, 2015

Related U.S. Application Data

(63) Continuation of application No. PCT/JP2013/062118, filed on Apr. 24, 2013.

(30) Foreign Application Priority Data

Apr. 27, 2012 (JP) ................................. 2012-103147

(51) Int. Cl.
| C03C 3/091 | (2006.01) |
| C03C 3/093 | (2006.01) |
| C03C 3/087 | (2006.01) |

(52) U.S. Cl.
CPC ................. *C03C 3/091* (2013.01); *C03C 3/087* (2013.01); *C03C 3/093* (2013.01)

(58) Field of Classification Search
CPC .......... C03C 3/091; C03C 3/093; C03C 3/087
See application file for complete search history.

(56) References Cited

U.S. PATENT DOCUMENTS

| 4,634,683 | A | 1/1987 | Dumbaugh, Jr. |
| 4,634,684 | A | 1/1987 | Dumbaugh, Jr. |
| 4,666,868 | A | 5/1987 | Dumbaugh, Jr. |
| 4,666,869 | A | 5/1987 | Dumbaugh, Jr. |
| 5,244,847 | A | 9/1993 | Kushitani et al. |
| 5,326,730 | A | 7/1994 | Dumbaugh, Jr. et al. |
| 6,329,310 | B1 | 12/2001 | Peuchert et al. |
| 2007/0191207 | A1 | 8/2007 | Danielson et al. |
| 2010/0107697 | A1 | 5/2010 | Yamamoto et al. |
| 2012/0149544 | A1 | 6/2012 | Nagai et al. |
| 2014/0287905 | A1 | 9/2014 | Tokunaga et al. |
| 2014/0366581 | A1 | 12/2014 | Tokunaga et al. |
| 2015/0045201 | A1* | 2/2015 | Tokunaga ............... C03C 3/112 501/59 |
| 2015/0087494 | A1* | 3/2015 | Tokunaga ............... C03C 3/112 501/67 |
| 2015/0299028 | A1* | 10/2015 | Nishizawa ............... C03C 3/091 501/66 |

FOREIGN PATENT DOCUMENTS

| CN | 1525945 A | | 9/2004 | |
| CN | 102417297 A | * | 4/2012 | |
| EP | 2 650 262 A1 | | 10/2013 | |
| JP | 62-100450 | | 5/1987 | |
| JP | 62-113735 | | 5/1987 | |
| JP | 4-325435 | | 11/1992 | |
| JP | 05-232458 | | 9/1993 | |
| JP | 10-45422 | | 2/1998 | |
| JP | 10045422 A | * | 2/1998 | |
| JP | WO 2014129424 A1 | * | 8/2014 | ............. C03C 3/118 |
| WO | 2009/028512 | | 3/2009 | |
| WO | 2011/001920 | | 1/2011 | |

OTHER PUBLICATIONS

U.S. Appl. No. 14/524,954, filed Oct. 27, 2014, Tokunaga, et al.
U.S. Appl. No. 14/541,484, filed Nov. 14, 2014, Tokunaga, et al.
U.S. Appl. No. 14/563,356, filed Dec. 8, 2014, Tokunaga, et al.
U.S. Appl. No. 14/561,399, filed Dec. 5, 2014, Nishizawa, et al.
International Search Report issued Jul. 9, 2013 in PCT/JP2013/062118 filed Apr. 24, 2013.
Supplementary Partial European Search Report issued Jan. 26, 2016 in Patent Application 13780855.6.
Extended European Search Report issued Apr. 5, 2016, in European Patent Application No. 13780855.6.

* cited by examiner

*Primary Examiner* — Elizabeth A Bolden
(74) *Attorney, Agent, or Firm* — Oblon, McClelland, Maier & Neustadt, L.L.P.

(57) ABSTRACT

The present invention relates to a non-alkali glass having a strain point of from 710° C. to lower than 725° C., an average thermal expansion coefficient at from 50 to 300° C. of from $30\times10^{-7}$ to $43\times10^{-7}$/° C., a temperature $T_2$ at which glass viscosity reaches $10^2$ dPa·s of 1710° C. or lower, a temperature $T_4$ at which the glass viscosity reaches $10^4$ dPd·s of 1320° C. or lower, and containing, indicated by mol % on the basis of oxides, $SiO_2$ 66 to 70, $Al_2O_3$ 12 to 14, $B_2O_3$ exceeding 0 to 1.5, MgO exceeding 9.5 to 13 (or 5 to 9.5), CaO 4 to 9 (or 4 to 11), SrO 0.5 to 4.5, BaO 0 to 0.5 and ZrO 0 to 2.

8 Claims, No Drawings

NON-ALKALI GLASS AND METHOD FOR PRODUCING SAME

TECHNICAL FIELD

The present invention relates to a non-alkali glass that is suitable as various display substrate glasses and photomask substrate glasses, does not substantially contain an alkali metal oxide and is float-formable.

BACKGROUND ART

In various display substrate glasses, particularly ones on whose surfaces a metal or oxide thin film is formed, the following characteristics have been conventionally required.

(1) Not substantially containing alkali metal ions; because in the case where an alkali metal oxide is contained, alkali metal ions diffuse in the thin film, resulting in deterioration of film characteristics.

(2) Having a high strain point so that deformation of a glass and shrinkage (thermal shrinkage) due to structure stabilization of the glass can be minimized when exposed to high temperature in a thin film formation step.

(3) Having sufficient chemical durability to various chemicals used in semiconductor formation; in particular, having durability to buffered hydrofluoric acid (BHF: mixed liquid of hydrofluoric acid and ammonium fluoride) for etching $SiO_x$ or $SiN_x$, a chemical solution containing hydrochloric acid used for etching of ITO, various acids (nitric acid, sulfuric acid and the like) used for etching of an metal electrode, and an alkaline of a resist removing liquid.

(4) Having no defects (bubbles, striae, inclusions, pits, flaws, etc.) in the inside and on the surface.

In addition to the above requirements, the glass is in the following situations, in recent years.

(5) Reduction in weight of a display is required, and the glass itself is also required to be a glass having a small density.

(6) Reduction in weight of a display is required, and a decrease in thickness of the substrate glass is desired.

(7) In addition to conventional amorphous silicon (a-Si) type liquid crystal displays, polycrystal silicon (p-Si) type liquid crystal displays requiring a slightly high heat treatment temperature have come to be produced (a-Si: about 350° C.→p-Si: 350 to 550° C.).

(8) In order to improve productivity and increase thermal shock resistance by increasing the rate of rising and falling temperature in heat treatment for preparation of a liquid crystal display, the glass having a small average thermal expansion coefficient is required.

On the other hand, dry etching has prevailed, and requirement of BHF resistance has come to be weakened. As conventional glasses, many glasses containing $B_2O_3$ in an amount of from 6 to 10 mol % have been used in order to improve BHF resistance. However, $B_2O_3$ has a tendency to decrease the strain point. As examples of non-alkali glasses containing no or only small amount of $B_2O_3$, there are the following ones:

Patent Document 1 discloses a $SiO_2$—$Al_2O_3$—SrO glass containing no $B_2O_3$. However, the temperature required for melting is high, which causes a difficulty in production.

Patent Document 2 discloses a $SiO_2$—$Al_2O_3$—SrO crystallized glass containing no $B_2O_3$. However, the temperature required for melting is high, which causes a difficulty in production.

Patent Document 3 discloses a glass containing $B_2O_3$ in an amount of from 0 to 3% by weight. However, the strain point in Examples thereof is 690° C. or lower.

Patent Document 4 discloses a glass containing $B_2O_3$ in an amount of from 0 to 5 mol %. However, the average thermal expansion coefficient thereof at from 50 to 300° C. exceeds $50 \times 10^{-7}/°$ C.

Patent Document 5 discloses a glass containing $B_2O_3$ in an amount of from 0 to 5 mol %. However, the thermal expansion thereof is large, and the density thereof is also high.

In order to solve the problems in the glasses described in Patent Documents 1 to 5, a non-alkali grass described in Patent Document 6 is proposed. The non-alkali grass described in Patent Document 6 is considered to have a high strain point, to be able to be formed by a float process, and to be suitable for use in display substrates, photomask substrates and the like.

However, there is a solid phase crystallization method as a method for producing a high quality p-Si TFT. And in order to perform this method, it is required to further increase the strain point.

On the other hand, from a request in a glass production process, particularly melting and forming, it has been required to decrease viscous properties of the glass, particularly the temperature $T_4$ at which glass viscosity reaches $10^4$ dPa·s.

PRIOR ART DOCUMENTS

Patent Documents

Patent Document 1: JP-A-62-113735
Patent Document 2: JP-A-62-100450
Patent Document 3: JP-A-4-325435
Patent Document 4: JP-A-5-232458
Patent Document 5: U.S. Pat. No. 5,326,730
Patent Document 6: JP-A-10-45422

SUMMARY OF THE INVENTION

Problems that the Invention is to Solve

As described above, the non-alkali glasses used as various display substrate glasses and photomask substrate glasses have been required to increase the strain point higher.

However, when the strain point is too high, the following points become problems at the time of glass production.

The temperature in a float bath and at an outlet of the float bath is increased to have an influence on the lifetime of metal members positioned in the float bath and on the downstream side of the float bath in some cases.

It is necessary to increase the temperature in a part leading from an outlet of the float bath to an annealing furnace, because plane strain of the glass is improved. However, when the temperature in this case is too high, a load is placed on a heater used for heating to have an influence on the lifetime of the heater in some cases.

From the above viewpoints, the temperature of the strain point is desirably from 710° C. to lower than 725° C.

An object of the present invention is to provide a non-alkali glass that solves the above-mentioned disadvantages, has a strain point of from 710° C. to lower than 725° C. and a low viscosity, particularly a low temperature $T_4$ at which glass viscosity reaches $10^4$ dPa·s, and is easily float-formable.

Means for Solving the Problems

The present invention provides a non-alkali glass having a strain point of from 710° C. to lower than 725° C., an average thermal expansion coefficient at from 50 to 300° C. of from $30\times10^{-7}$ to $43\times10^{-7}/°$ C., a temperature $T_2$ at which glass viscosity reaches $10^2$ dPa·s of 1710° C. or lower, a temperature $T_4$ at which the glass viscosity reaches $10^4$ dPa·s of 1320° C. or lower, and containing, indicated by mol % on the basis of oxides, $SiO_2$ 66 to 70,
$Al_2O_3$ 12 to 14,
$B_2O_3$ exceeding 0 to 1.5,
MgO exceeding 9.5 to 13,
CaO 4 to 9,
SrO 0.5 to 4.5,
BaO 0 to 0.5 and
$ZrO_2$ 0 to 2, in which MgO+CaO+SrO+BaO is from 17 to 21, MgO(MgO+CaO+SrO+BaO) is 0.4 or more, MgO/(MgO+CaO) is 0.4 or more, and MgO/(MgO+SrO) is 0.6 or more.

The present invention provides a non-alkali glass having a strain point of from 710° C. to lower than 725° C., an average thermal expansion coefficient at from 50 to 300° C. of from $30\times10^{-7}$ to $43\times10^{-7}/°$ C., a temperature $T_2$ at which glass viscosity reaches $10^2$ dPa·s of 1710° C. or lower, a temperature $T_4$ at which the glass viscosity reaches $10^4$ dPa·s of 1320° C. or lower, and containing, indicated by mol % on the basis of oxides, $SiO_2$ 66 to 70,
$Al_2O_3$ 12 to 14,
$B_2O_3$ exceeding 0 to 1.5,
MgO 5 to 9.5,
CaO 4 to 11,
SrO 0.5 to 4.5,
BaO 0 to 0.5 and
$ZrO_2$ 0 to 2, in which MgO+CaO+SrO+BaO is from exceeding 18.2 to 21, MgO/(MgO+CaO+SrO+BaO) is 0.25 or more, MgO/(MgO+CaO) is 0.3 or more, MgO/(MgO+SrO) is 0.6 or more, and $Al_2O_3\times(MgO/(MgO+CaO+SrO+BaO))$ is 5.5 or more.

Advantageous Effects of Invention

The non-alkali glass of the present invention is suitable particularly for display substrates, photomask substrates and the like for use at a high strain point, and further, is an easily float-formable glass.

MODE FOR CARRYING OUT THE INVENTION

The composition range of each component is described below. In the case where $SiO_2$ is less than 66% (mol %, hereinafter the same unless otherwise noted), the strain point is not sufficiently increased, the thermal expansion coefficient is increased, and the density is increased. It is preferably 66.5% or more. In the case of exceeding 70%, the meltability is decreased and the devitrification temperature is increased. It is preferably 69% or less, and more preferably 68% or less.

$Al_2O_3$ suppresses phase separation properties of the glass, decreases the thermal expansion coefficient and increases the strain point. However, in the case of less than 12%, these effects do not appear, resulting in increasing other components for increasing expansion. As a result, thermal expansion becomes large. It is preferably 12.5% or more. In the case of exceeding 14%, there is a concern that the meltability of the glass is deteriorated, or that the devitrification temperature is increased. It is preferably 13.5% or less.

$B_2O_3$ improves melting reactivity of the glass and decreases the devitrification temperature, and therefore can be added in an amount of exceeding 0% to 1.5%. In order to obtain the above-mentioned effects, it is preferably 0.2% or more, more preferably 0.3% or more, and still more preferably 0.4% or more. However, too much causes a decrease in the strain point. It is preferably 1.4% or less, and more preferably 1.3% or less.

MgO has characteristics that it does not increase expansion and does not excessively decrease the strain point, among alkali earths, and also improves the meltability.

In a first embodiment of the non-alkali glass of the present invention, the MgO content is from exceeding 9.5% to 13%. In the case of 9.5% or less, the above-mentioned effects due to addition of MgO do not sufficiently appear. However, in the case of exceeding 13%, there is a concern that the devitrification temperature is increased. It is preferably 12.5% or less, more preferably 12.0% or less, and still more preferably 11.5% or less.

On the other hand, in a second embodiment of the non-alkali glass of the present invention, the MgO content is from 5% to 9.5%. In the case of less than 5%, the above-mentioned effects due to addition of MgO do not sufficiently appear. It is preferably 6% or more, and more preferably 7% or more. However, in the case of exceeding 9.5%, there is a concern that the devitrification temperature is increased. It is preferably 9.3% or less, and more preferably 9% or less.

CaO has characteristics that it does not increase expansion and does not excessively decrease the strain point, next to MgO, among alkali earths, and also improves the meltability.

In the first embodiment of the non-alkali glass of the present invention, the CaO content is from 4% to 9%. In the case of less than 4%, the above-mentioned effects due to addition of CaO do not sufficiently appear. It is preferably 4.5% or more, and more preferably 5% or more. However, in the case of exceeding 9%, there is a concern that the devitrification temperature is increased, or that phosphorus that is an impurity in limestone ($CaCO_3$) as a raw material of CaO is incorporated in a large amount. It is preferably 8.5% or less, and more preferably 8% or less.

On the other hand, in the second embodiment of the non-alkali glass of the present invention, the CaO content is from 4% to 11%. In the case of less than 4%, the above-mentioned effects due to addition of CaO do not sufficiently appear. It is preferably 4.5% or more, and more preferably 5% or more. However, in the case of exceeding 11%, there is a concern that the devitrification temperature is increased, or that phosphorus that is an impurity in limestone ($CaCO_3$) as a raw material of CaO is incorporated in a large amount. It is preferably 10% or less, more preferably 9% or less, and still more preferably 8% or less.

SrO improves the meltability without increasing the devitrification temperature of the glass. However, in the case of less than 0.5%, this effect does not sufficiently appear. It is preferably 1% or more, more preferably 2% or more, and still more preferably 3% or more. However, in the case of exceeding 4.5%, there is a concern that the thermal expansion coefficient is increased.

BaO is not essential, but can be contained in order to improve the meltability. However, too much causes excessive increases in expansion and density of the glass, so that the content thereof is 0.5% or less. It is preferably 0.3% or less, and more preferably 0.1% or less, and it is further preferred that BaO is not substantially contained. The term "not substantially contained" means that it is not contained except for inevitable impurities.

$ZrO_2$ may be contained up to 2% in order to decrease the glass melting temperature or to promote crystal precipitation at the time of burning. In the case of exceeding 2%, the glass becomes unstable, or the dielectric constant ∈ of the glass is increased. It is preferably 1.5% or less, more preferably 1% or less, and still more preferably 0.5% or less, and it is particularly preferred that $ZrO_2$ is not substantially contained.

In the first embodiment of the non-alkali glass of the present invention, when the total amount of MgO, CaO, SrO and BaO is less than 17%, the meltability is deteriorated. It is preferably 18% or more. When it is more than 21%, there is a concern that a drawback of failing to decrease the thermal expansion coefficient occurs. It is preferably 20% or less.

On the other hand, in the second embodiment of the non-alkali glass of the present invention, when the total amount of MgO, CaO, SrO and BaO is 18.2% or less, the meltability is deteriorated. When it is more than 21%, there is a concern that a drawback of failing to decrease the thermal expansion coefficient occurs. It is preferably 20% or less.

In the first embodiment of the non-alkali glass of the present invention, when the total amount of MgO, CaO, SrO and BaO satisfies the above and the following 3 requirements are also satisfied, the strain point can be increased, and further the viscous properties of the glass, particularly the temperature $T_4$ at which glass viscosity reaches $10^4$ dPa·s can be decreased without increasing the devitrification temperature.

MgO/(MgO+CaO+SrO+BaO) is 0.4 or more, and preferably 0.45 or more.

MgO/(MgO+CaO) is 0.4 or more, preferably 0.52 or more, more preferably 0.55 or more, and still more preferably 0.6 or more.

MgO/(MgO+SrO) is 0.6 or more, preferably 0.63 or more, and more preferably 0.65 or more.

In the second embodiment of the non-alkali glass of the present invention, when the total amount of MgO, CaO, SrO and BaO satisfies the above and the following 3 requirements are satisfied, the strain point can be increased, and further the viscous properties of the glass, particularly the temperature $T_4$ at which glass viscosity reaches $10^4$ dPa·s can be decreased without increasing the devitrification temperature.

MgO/(MgO+CaO+SrO+BaO) is 0.25 or more, preferably 0.3 or more, more preferably 0.4 or more, and still more preferably 0.45 or more.

MgO/(MgO+CaO) is 0.3 or more, preferably 0.4 or more, more preferably 0.52 or more, still more preferably 0.55 or more, and particularly preferably 0.6 or more.

MgO/(MgO+SrO) is 0.6 or more, preferably 0.63 or more, and more preferably 0.65 or more.

In the second embodiment of the non-alkali glass of the present invention, $Al_2O_3 \times (MgO/(MgO+CaO+SrO+BaO))$ is preferably 5.5 or more, because the Young's modulus can be increased. It is preferably 5.75 or more, more preferably 6 or more, and still more preferably 6.25 or more.

The non-alkali glass of the present invention does not contain alkali metal oxides in amounts exceeding impurity level (that is to say, does not substantially contain) in order not to allow deterioration in characteristics of a metal or oxide thin film provided on the glass surface at the time of panel production to occur. Further, for the same reason, it is preferred that $P_2O_5$ is not substantially contained. Furthermore, in order to facilitate recycle of the glass, it is preferred that PbO, $As_2O_3$ and $Sb_2O_3$ are not substantially contained.

In addition to the above-mentioned components, the non-alkali glass of the present invention can contain ZnO, $Fe_2O_3$, $SO_3$, F, Cl and $SnO_2$ in a total amount of 5% or less, in order to improve the meltability, clarity and formability (float formability) of the glass.

The non-alkali glass of the present invention has a strain point of from 710° C. to lower than 725° C.

The non-alkali glass of the present invention has a strain point of 710° C. or higher, so that the thermal shrinkage at the time of panel production can be suppressed. Further, a solid phase crystallization method can be applied as a production method of p-Si TFT.

The non-alkali glass of the present invention has a strain point of 710° C. or higher, so that it is suitable for high strain point use (e.g., a display substrate or a lighting substrate for organic EL, or a thin display substrate or lighting substrate having a thickness of 100 μm or less).

In forming of a sheet glass having a thickness of 100 μm or less, the drawing rate at the time of forming tends to become fast, so that the fictive temperature of the glass is increased, and compaction of the glass is liable to be increased. In this case, when the glass is a high strain point glass, the compaction can be suppressed.

On the other hand, since the strain point is lower than 725° C., it is unnecessary to increase the temperature in a float bath and at an outlet of the float bath so high. Therefore there is a little influence on the lifetime of metal members positioned in the float bath and on the downstream side of the float bath.

Further, it is necessary to increase the temperature in a part leading from the outlet of the float bath to an annealing furnace. However, it is unnecessary to increase the temperature in this case so high because plane strain of the glass is improved. For this reason, a load is not placed on a heater used for heating and there is a little influence on the lifetime of the heater.

Further, in the non-alkali glass of the present invention, the glass transition point is preferably 760° C. or higher, more preferably 770° C. or higher, and still more preferably 780° C. or higher, for the same reason as the strain point.

Furthermore, in the non-alkali glass of the present invention, the average thermal expansion coefficient at from 50 to 300° C. is from $30 \times 10^{-7}$ to $43 \times 10^{-7}$/° C., the thermal shock resistance is large, and the productivity at the time of panel production can be increased. In the non-alkali glass of the present invention, the average thermal expansion coefficient at from 50 to 300° C. is preferably $35 \times 10^{-7}$/° C. or more. The average thermal expansion coefficient at from 50 to 300° C. is preferably $42 \times 10^{-7}$/° C. or less, more preferably $41 \times 10^{-7}$/° C. or less, and still more preferably $40 \times 10^{-7}$/° C. or less.

In addition, in the non-alkali glass of the present invention, the specific gravity is preferably 2.65 or less, more preferably 2.64 or less, and still more preferably 2.62 or less.

Moreover, in the non-alkali glass of the present invention, the temperature $T_2$ at which the viscosity η becomes $10^2$ poise (dPa·s) is 1710° C. or lower, preferably less than 1710° C., more preferably 1700° C. or lower, and still more preferably 1690° C. or lower. Melting thereof is therefore relatively easy.

Further, in the non-alkali glass of the present invention, the temperature $T_4$ at which the viscosity η becomes $10^4$ poise (dPa·s) is 1320° C. or lower, preferably 1315° C. or lower, more preferably 1310° C. or lower, and still more preferably 1305° C. or lower. This is suitable for float forming.

Furthermore, in the non-alkali glass of the present invention, the devitrification temperature is preferably 1350° C. or lower, because forming by a float process becomes easy. It is preferably 1340° C. or lower, and more preferably 1330° C. or lower.

The devitrification temperature in the present description is the average value of the maximum temperature at which crystals precipitate on the surface and in the inside of the glass and the minimum temperature at which crystals do not precipitate, which are determined by placing crushed glass particles on a platinum dish, performing heat treatment for 17 hours in an electric furnace controlled to a constant temperature, and performing observation under an optical microscope after the heat treatment.

In addition, in the non-alkali glass of the present invention, the Young's modulus is preferably 84 GPa or more, more preferably 86 GPa or more, and still more preferably 88 GPa or more.

Moreover, in the non-alkali glass of the present invention, the photoelastic constant is preferably 31 nm/MPa/cm or less.

When the glass substrate has birefringence due to stress generated in a production step of a liquid crystal display panel or at the time of use of a liquid crystal display apparatus, a phenomenon that display of black turns to grey to decrease a contrast of the liquid crystal display is sometimes observed. This phenomenon can be suppressed by adjusting the photoelastic constant to 31 nm/MPa/cm or less. It is preferably 30 nm/MPa/cm or less, more preferably 29 nm/MPa/cm or less, still more preferably 28.5 nm/MPa/cm or less, and particularly preferably 28 nm/MPa/cm or less.

Further, in the non-alkali glass of the present invention, the photoelastic constant is preferably 23 nm/MPa/cm or more, and more preferably 25 nm/MPa/cm or more, considering easiness of securing other physical properties.

Incidentally, the photoelastic constant can be measured by a disk compression method.

Further, it is preferred that the non-alkali glass of the present invention has a dielectric constant of 5.6 or more.

In the case of an In-Cell type touch panel (a touch sensor is incorporated in a liquid crystal display panel) as described in JP-A-2011-70092, it is better that the glass substrate has a higher dielectric constant from the standpoints of improvement in sensing sensitivity of the touch sensor, a decrease in drive voltage and electric power saving. When the dielectric constant is 5.6 or more, the sensing sensitivity of the touch sensor is improved. It is preferably 5.8 or more, and more preferably 6.0 or more. In view of suppressing deterioration in display quality of an image of a liquid crystal display (crosstalk), an increase in power consumption and difficulty in realizing high definition, it is preferably 7.5 or less, more preferably 7 or less, and still more preferably 6.5 or less.

The dielectric constant can be measured according to the method described in JIS C-2141.

The non-alkali glass of the present invention can be produced, for example, by the following method. Raw materials of respective components generally used are mixed so as to obtain the target components, and the resulting mixture is continuously placed in a melting furnace, and heated at 1,500 to 1,800° C. to melt it. The molten glass obtained is formed to a predetermined sheet thickness by a float process, followed by annealing and thereafter cutting, thereby being able to obtain a sheet glass.

The glass of the present invention has relatively low meltability, so that the following are preferably used as raw materials of respective components.

(Silicon Source)

Silica sand can be used as a silicon source of $SiO_2$ raw material. When silica sand having a median diameter $D_{50}$ of from 20 to 27 μm, a ratio of particles having a particle size of 2 μm or less of 0.3% by volume or less and a ratio of particles having a particle size of 100 μm or more of 2.5% by volume or less is used, silica sand can be melted while suppressing aggregation thereof, so that melting of silica sand becomes easy to obtain the non-alkali glass having less bubbles and high homogeneity and flatness. This is therefore preferred.

Incidentally, the "particle size" in the present description means a sphere equivalent size (means a primary particle size, in the present invention) of silica sand, and specifically means a particle size in particle size distribution of a powder measured by a laser diffraction/scattering method.

Further, the "median diameter $D_{50}$" in the present description means a particle size where, in particle size distribution of a powder measured by a laser diffraction method, volume frequency of particles having a particle size larger than a certain particle size occupies 50% of that of the whole powder. In other words, the term means a particle size at the time when the cumulative frequency is 50% in particle size distribution of a powder measured by a laser diffraction method.

Furthermore, the "ratio of particles having a particle size of 2 μm or less" and the "ratio of particles having a particle size of 100 μm or more" in the present description are measured, for example, by measuring particle size distribution by a laser diffraction/scattering method.

It is more preferred that the median diameter $D_{50}$ of silica sand is 25 μm or less, because melting of silica sand becomes easier.

In addition, it is particularly preferred that the ratio of particles having a particle size of 100 μm or more in silica sand is 0%, because melting of silica sand becomes easier.

(Alkali Earth Metal Source)

An alkali earth metal compound can be used as the alkaline earth metal source. Specific examples of the alkaline earth metal compounds include carbonates such as $MgCO_3$, $CaCO_3$, $BaCO_3$, $SrCO_3$ and $(Mg, Ca)CO_3$ (dolomite), oxides such as MgO, CaO, BaO and SrO, and hydroxides such as $Mg(OH)_2$, $Ca(OH)_2$, $Ba(OH)_2$ and $Sr(OH)_2$. It is preferred that the hydroxide of the alkaline earth metal is allowed to be contained in a part or the whole of the alkaline earth metal source, because the amount of an unmelted $SiO_2$ component at the time of melting the glass raw materials is decreased. When the amount of the unmelted $SiO_2$ component contained in silica sand is increased, the unmelted $SiO_2$ is incorporated in bubbles in the case where the bubbles are generated in the glass melt, and accumulates near a surface layer of the glass melt. This causes difference in compositional ratio of $SiO_2$ between the surface layer of the glass melt and parts other than the surface layer. As a result, homogeneity of the glass is deteriorated, and additionally, flatness is decreased.

It is more preferred that the content of the hydroxide of the alkaline earth metal is preferably from 15 to 100 mol % (in terms of MO, provided that M is an alkaline earth metal element, hereinafter the same), more preferably from 30 to 100 mol % (in terms of MO), and still more preferably from 60 to 100 mol % (in terms of MO), of 100 mol % of the alkaline earth metal source (in terms of MO), because the amount of the unmelted $SiO_2$ component at the time of melting the glass raw materials is decreased.

The amount of the unmelted $SiO_2$ component at the time of melting the glass raw materials is decreased with an increase in the molar ratio of the hydroxide in the alkaline earth metal source. Accordingly, the higher molar ratio of the hydroxide is more preferred.

As the alkaline earth metal source, there can be used, specifically, a mixture of the hydroxide and the carbonate of the alkaline earth metal, the hydroxide alone of the alkaline earth metal, and the like. It is preferred to use at least one of $MgCO_3$, $CaCO_3$, and $(Mg, Ca)(CO_3)_2$ (dolomite) as the carbonate. Further, it is preferred to use at least one of $Mg(OH)_2$ or $Ca(OH)_2$ as the hydroxide of the alkaline earth metal, and it is particularly preferred to use $Mg(OH)_2$.

(Boron Source)

When the non-alkali glass contains $B_2O_3$, a boron compound can be used as the boron source of $B_2O_3$. Specific examples of the boron compounds include orthoboric acid ($H_3BO_3$), metaboric acid ($HBO_2$), tetraboric acid ($H_2B_4O_7$), boric anhydride ($B_2O_3$) and the like. In the usual non-alkali glass production, orthoboric acid is used in terms of being inexpensive and easily available.

In the present invention, it is preferred that one containing boric anhydride in an amount of from 10 to 100% by mass (in terms of $B_2O_3$), of 100% by mass (in terms of $B_2O_3$) of the boron source, is used as the boron source. When boric anhydride is contained in an amount of 10% by mass or more, aggregation of the glass raw materials is suppressed, and effects of reducing bubbles and improving homogeneity and flatness are obtained. The amount of boric anhydride is more preferably from 20 to 100% by mass, and still more preferably from 40 to 100% by mass.

As the boron compound other than boric anhydride, orthoboric acid is preferred in terms of being inexpensive and easily available.

EXAMPLES

Examples 1 to 5 and Examples 8 to 14 are Examples of the present invention, and Examples 6 and 7 are Comparative Examples below. Raw materials of respective components were mixed so as to obtain a target composition, and melted at a temperature of from 1500 to 1600° C. by using a platinum crucible. As for the particle size of silica sand in the raw materials, the median particle size $D_{50}$ was 26 μm, the ratio of particles having a particle size of 2 μm or less was less than 0.1% by volume, and the ratio of particles having a particle size of 100 μm or more was less than 0.1% by volume. Further, the molar ratio (in terms of MO) of the hydroxide raw materials in the alkali earth metals was 26%. In melting, stirring was performed by using a platinum stirrer to homogenize the glass. Then, the molten glass was allowed to flow out, and formed into a sheet shape, followed by annealing.

Tables 1 and 2 show the glass compositions (unit: mol %), the thermal expansion coefficient at 50 to 300° C. (unit: ×$10^{-7}$/° C.), the strain point (unit: ° C.), the glass transition point (unit: ° C.), the specific gravity, the Young's modulus (GPa) (measured by an ultrasonic method), the temperature $T_2$ (temperature at which glass viscosity η reaches $10^2$ poise, unit: ° C.) giving an indication of meltability and the temperature $T_4$ (temperature at which glass viscosity η reaches $10^4$ poise, unit: ° C.) giving indications of float formability and fusion formability, as high temperature viscosity values, the devitrification temperature (unit: ° C.), the photoelastic constant (unit: nm/MPa/cm) (measured by a disk compression method) and the dielectric constant (measured by a method described in JIS C-2141).

Incidentally, values in parentheses in Tables 1 and 2 are calculated values.

TABLE 1

| Mol % | Ex. 1 | Ex. 2 | Ex. 3 | Ex. 4 | Ex. 5 | Ex. 6 | Ex. 7 |
|---|---|---|---|---|---|---|---|
| $SiO_2$ | 67 | 67.1 | 66.9 | 66.9 | 66.9 | 69 | 69 |
| $Al_2O_3$ | 13.1 | 13 | 13.2 | 13.1 | 13 | 12.5 | 12.5 |
| $B_2O_3$ | 0.4 | 0.7 | 0.9 | 1.1 | 1.3 | 0 | 1 |
| MgO | 9.9 | 9.7 | 9.3 | 9.2 | 9 | 9 | 5.8 |
| CaO | 5.3 | 7.2 | 5.3 | 5.3 | 5.3 | 4.8 | 5.8 |
| SrO | 4.3 | 2.3 | 4.4 | 4.4 | 4.5 | 4.8 | 5.8 |
| BaO | 0 | 0 | 0 | 0 | 0 | 0 | 0 |
| $ZrO_2$ | 0 | 0 | 0 | 0 | 0 | 0 | 0 |
| MgO + CaO + SrO + BaO | 19.5 | 19.2 | 19.0 | 18.9 | 18.8 | 18.6 | 17.4 |
| MgO/(MgO + CaO + SrO + BaO) | 0.51 | 0.51 | 0.49 | 0.49 | 0.48 | 0.48 | 0.33 |
| MgO/(MgO + CaO) | 0.65 | 0.57 | 0.64 | 0.63 | 0.63 | 0.65 | 0.50 |
| MgO/(MgO + SrO) | 0.70 | 0.81 | 0.68 | 0.68 | 0.67 | 0.65 | 0.50 |
| $Al_2O_3$ × (MgO/(MgO + CaO + SrO + BaO)) | 6.65 | 6.57 | 6.46 | 6.38 | 6.22 | 6.05 | 4.17 |
| Average Thermal Expansion Coefficient [×$10^{-7}$/° C.] | 40.6 | 38.9 | 40.2 | 39.5 | 40.4 | 34 | 26 |
| Strain Point [° C.] | 724 | 720 | 719 | 718 | 714 | 750 | 730 |
| Glass Transition Point [° C.] | 786 | 784 | 783 | 784 | 779 | (812) | (791) |
| Specific Gravity | 2.59 | 2.55 | 2.59 | 2.59 | 2.59 | 2.57 | 2.59 |
| Young's Modulus [GPa] | 89 | 88 | 88 | 88 | 88 | (85) | (83) |
| $T_2$ [° C.] | 1649 | 1646 | 1645 | 1644 | 1644 | 1730 | 1680 |
| $T_4$ [° C.] | 1304 | 1300 | 1300 | 1298 | 1298 | 1340 | 1330 |
| Devitrification Temperature [° C.] | 1255 | 1253 | 1261 | 1270 | 1275 | 1310 | 1300 |
| Photoelastic Constant [nm/MPa/cm] | 26 | 27 | 26 | 26 | 27 | (28) | (27) |
| Dielectric Constant | 6.1 | 6.2 | 6.2 | 6.2 | 6.1 | | |

TABLE 2

| Mol % | Ex. 8 | Ex. 9 | Ex. 10 | Ex. 11 | Ex. 12 | Ex. 13 | Ex. 14 |
|---|---|---|---|---|---|---|---|
| $SiO_2$ | 68.5 | 68.7 | 68.5 | 67.6 | 68.8 | 68.6 | 66.2 |
| $Al_2O_3$ | 13.0 | 12.0 | 13.8 | 12.6 | 12.2 | 12.7 | 12.9 |
| $B_2O_3$ | 1.3 | 0.6 | 0.2 | 1.3 | 0.5 | 0.3 | 1.3 |
| MgO | 11.0 | 11.4 | 12.8 | 8.2 | 8.9 | 11.4 | 8.9 |
| CaO | 4.2 | 4.2 | 4.1 | 8.4 | 9.0 | 4.1 | 5.2 |
| SrO | 2.0 | 3.1 | 0.7 | 1.9 | 0.6 | 2.7 | 4.5 |
| BaO | 0 | 0 | 0 | 0 | 0 | 0.3 | 0 |
| $ZrO_2$ | 0 | 0 | 0 | 0 | 0 | 0 | 1.0 |
| MgO + CaO + SrO + BaO | 17.2 | 18.7 | 17.6 | 18.5 | 18.5 | 18.5 | 18.6 |
| MgO/(MgO + CaO + SrO + BaO) | 0.64 | 0.61 | 0.73 | 0.44 | 0.48 | 0.62 | 0.48 |
| MgO/(MgO + CaO) | 0.72 | 0.73 | 0.76 | 0.49 | 0.50 | 0.74 | 0.63 |
| MgO/(MgO + SrO) | 0.85 | 0.79 | 0.95 | 0.82 | 0.94 | 0.81 | 0.67 |
| $Al_2O_3$ × (MgO/(MgO + CaO + SrO + BaO)) | 8.30 | 7.31 | 10.01 | 5.60 | 5.88 | 7.82 | 6.16 |
| Average Thermal Expansion Coefficient [×$10^{-7}$/° C.] | (36.2) | (38.8) | (35.4) | (40.1) | (39.6) | (37.6) | (41.3) |

TABLE 2-continued

| Mol % | Ex. 8 | Ex. 9 | Ex. 10 | Ex. 11 | Ex. 12 | Ex. 13 | Ex. 14 |
|---|---|---|---|---|---|---|---|
| Strain Point [° C.] | (721) | (722) | (722) | (723) | (720) | (722) | (723) |
| Glass Transition Point [° C.] | (786) | (775) | (807) | (775) | (786) | (782) | (758) |
| Specific Gravity | (2.52) | (2.54) | (2.51) | (2.54) | (2.52) | (2.55) | (2.63) |
| Young's Modulus [GPa] | (85) | (84) | (88) | (86) | (86) | (86) | (86) |
| $T_2$ [° C.] | (1666) | (1671) | (1663) | (1647) | (1655) | (1673) | (1644) |
| $T_4$ [° C.] | (1310) | (1310) | (1317) | (1295) | (1303) | (1316) | (1300) |
| Devitrification Temperature [° C.] | | | | | | | |
| Photoelastic Constant [nm/MPa/cm] | (28) | (26) | (25) | (27) | (26) | (25) | (27) |
| Dielectric Constant | | | | | | | |

As apparent from the tables, all the glasses of Examples of the present invention have a thermal expansion coefficient as low as from $30\times10^{-7}$ to $43\times10^{-7}/°$ C. and a strain point of from 710° C. to lower than 725° C., and can sufficiently resist heat treatment at high temperature. On the other hand, they have little influence on the lifetime of metal members positioned in a float bath and on the downstream side of the float bath or a heater used in a part leading from an outlet of the float bath to an annealing furnace at the time of glass production.

The temperature $T_2$ giving an indication of meltability is also relatively low as 1710° C. or lower, and melting is easy. The temperature $T_4$ giving an indication of formability is 1320° C. or lower, and forming by a float process is easy. Further, the devitrification temperature is 1350° C. or lower, so that the glasses are considered to be free from any problems such as the occurrence of devitrification at the time of float forming.

The photo elastic constant is 31 nm/MPa/cm or less, and when used as a glass substrate for a liquid crystal display, a decrease in contrast can be suppressed.

Further, the dielectric constant is 5.6 or more, and when used as a glass substrate for an In-Cell type touch panel, sensing sensitivity of a touch sensor is improved.

The present invention has been described in detail with reference to specific embodiments thereof, but it will be apparent to one skilled in the art that various modifications and changes can be made without departing from the spirit and scope of the present invention.

The present application is based on Japanese Patent Application No. 2012-103147 filed on Apr. 27, 2012, the contents of which are incorporated herein by reference.

INDUSTRIAL APPLICABILITY

The non-alkali glass of the present invention has a high strain point, is formable by a float process, and is suitable for use in display substrates, photomask substrates and the like. Further, it is also suitable for use in solar cell substrates and the like.

The invention claimed is:

1. A non-alkali glass having a strain point of from 710° C. to lower than 725° C., an average thermal expansion coefficient at from 50 to 300° C. of from $30\times10^{-7}$ to $43\times10^{-7}/°$ C., a temperature $T_2$ at which glass viscosity reaches $10^2$ dPa·s of 1710° C. or lower, a temperature $T_4$ at which the glass viscosity reaches $10^4$ dPa·s of 1320° C. or lower, and comprising, indicated by mol % on the basis of oxides,
SiO$_2$ 66 to 70,
Al$_2$O$_3$ 12 to 14,
B$_2$O$_3$ exceeding 0 to 1.5,
MgO 5 to 9.5,
CaO 4 to 11,
SrO 0.5 to 4.5,
BaO 0 to 0.5 and
ZrO$_2$ 0 to 2,
wherein MgO+CaO+SrO+BaO is from exceeding 18.2 to 21,
MgO/(MgO+CaO+SrO+BaO) is 0.25 or more,
MgO/(MgO+CaO) is 0.3 or more,
MgO/(MgO+SrO) is 0.6 or more, and
Al$_2$O$_3$×(MgO/(MgO+CaO+SrO+BaO)) is 5.5 or more.

2. The non-alkali glass according to claim 1, having a glass transition point of 760° C. or higher, a specific gravity of 2.65 or less, a Young's modulus of 84 GPa or more, a devitrification temperature of 1340° C. or lower, a photoelastic constant of from 25 to 29 nm/MPa/cm, and a dielectric constant of 5.8 to 6.5.

3. The non-alkali glass according to claim 1, having a glass transition point of 770° C. or higher, a specific gravity of 2.62 or less, a Young's modulus of 84 GPa or more, a devitrification temperature of 1330° C. or lower, a photoelastic constant of from 25 to 29 nm/MPa/cm, and a dielectric constant of 5.8 to 6.5.

4. The non-alkali glass according to claim 1, having the strain point of from 710° C. to lower than 725° C., the average thermal expansion coefficient at from 50 to 300° C. of from $35\times10^{-7}$ to $42\times10^{-7}/°$ C., the temperature $T_2$ at which glass viscosity reaches $10^2$ dPa·s of 1690° C. or lower, the temperature $T_4$ at which the glass viscosity reaches $10^4$ dPa·s of 1315° C. or lower, and comprising, indicated by mol % on the basis of oxides,
SiO$_2$ 66 to 69,
Al$_2$O$_3$ 12 to 13.5,
B$_2$O$_3$ 0.4 to 1.4,
MgO 7 to 9.5,
CaO 4.5 to 8,
SrO 3 to 4.5,
BaO 0 to 0.1 and
ZrO$_2$ 0 to 1,
wherein MgO+CaO+SrO+BaO is from 18.2 to 20,
MgO/(MgO+CaO+SrO+BaO) is 0.4 or more,
MgO/(MgO+CaO) is 0.55 or more,
MgO/(MgO+SrO) is 0.63 or more, and
Al$_2$O$_3$×(MgO/(MgO+CaO+SrO+BaO)) is 5.75 or more.

5. The non-alkali glass according to claim 1, having the strain point of from 710° C. to lower than 725° C., the average thermal expansion coefficient at from 50 to 300° C. of from $35\times10^{-7}$ to $41\times10^{-7}/°$ C., the temperature $T_2$ at which glass viscosity reaches $10^2$ dPa·s of 1690° C. or lower, the temperature $T_4$ at which the glass viscosity reaches $10^4$ dPa·s of 1310° C. or lower, and comprising, indicated by mol % on the basis of oxides,
SiO$_2$ 66.5 to 68,
Al$_2$O$_3$ 12.5 to 13.5,
B$_2$O$_3$ 0.4 to 1.3,
MgO 7 to 9.5,
CaO 5 to 8, SrO 3 to 4.5,
substantially no BaO and
substantially no $ZrO_2$,
wherein MgO+CaO+SrO+BaO is from exceeding 18.2 to 20,
MgO/(MgO+CaO+SrO+BaO) is 0.45 or more,
MgO/(MgO+CaO) is 0.6 or more,
MgO/(MgO+SrO) is 0.65 or more, and
$Al_2O_3 \times$(MgO/(MgO+CaO+SrO+BaO)) is 6 or more.

6. A method for producing the non-alkali glass described in claim 1, wherein silica sand having a median particle size $D_{50}$ of from 20 to 27 µm, a ratio of particles having a particle size of 2 µm or less of 0.3% by volume or less and a ratio of particles having a particle size of 100 µm or more of 2.5% by volume or less is used as a silicon source of a $SiO_2$ raw material.

7. A method for producing the non-alkali glass described in claim 1, wherein an alkaline earth metal source containing a hydroxide of an alkaline earth metal in an amount of from 15 to 100 mol % in terms of MO, provided that M is an alkaline earth metal element, of 100 mol % in terms of MO of the alkaline earth metal source is used as the alkaline earth metal source of MgO, CaO, SrO and BaO.

8. A method for producing the non-alkali glass described in claim 1, wherein silica sand having a median particle size $D_{50}$ of from 20 to 27 µm, a ratio of particles having a particle size of 2 µm or less of 0.3% by volume or less and a ratio of particles having a particle size of 100 µm or more of 2.5% by volume or less is used as a silicon source of a $SiO_2$ raw material, and an alkaline earth metal source containing a hydroxide of an alkaline earth metal in an amount of from 15 to 100 mol % in terms of MO, provided that M is an alkaline earth metal element, of 100 mol % in terms of MO of the alkaline earth metal source is used as the alkaline earth metal source of MgO, CaO, SrO and BaO.

\* \* \* \* \*